Dec. 12, 1950 M. A. C. ALAMAGNY 2,533,752
AUTOMOBILE VEHICLE
Filed Oct. 5, 1945
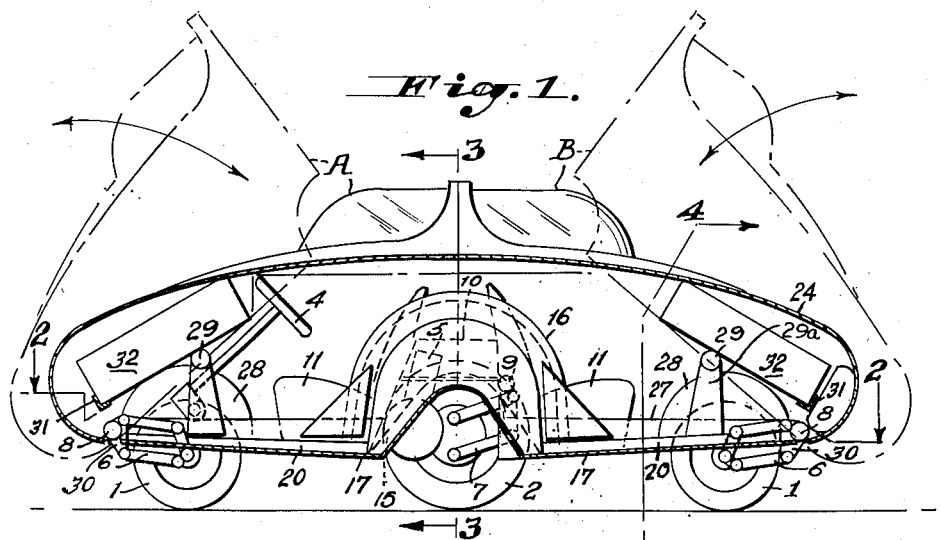
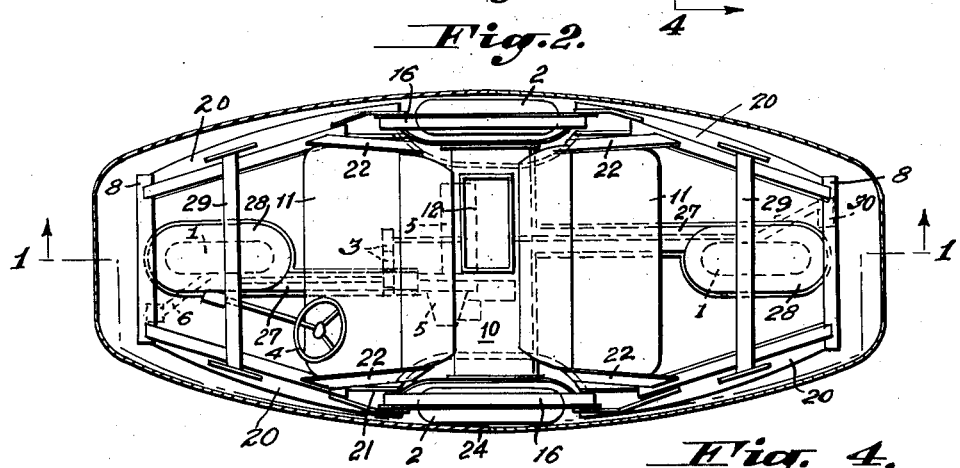
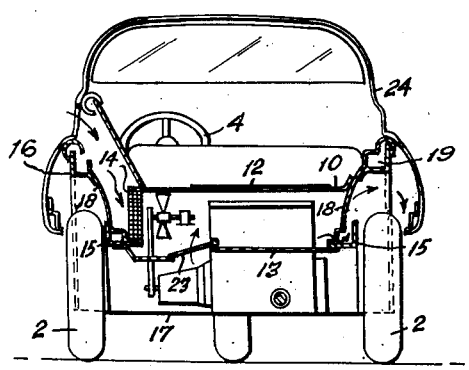
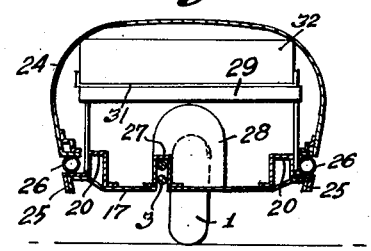
Inventor
Marcel A. C. Alamagny
By
Attorneys Patented Dec. 12, 1950

2,533,752

UNITED STATES PATENT OFFICE 2,533,752

AUTOMOBILE VEHICLE

Marcel Antoine Clement Alamagny,
Saint-Cloud, France

Application October 5, 1945, Serial No. 620,569
In France April 9, 1945

2 Claims. (Cl. 180—21)

The present invention relates to automobile vehicles and particularly relates to a vehicle of low selling price and low operating costs for a given performance and one presenting a pleasing appearance and a reliability superior to those vehicles of orthodox construction.

The invention therefore relates to an automobile vehicle comprising in combination a body of the type disclosed in my copending application Serial No. 620,568, filed of even date herewith, a frame including a floor constituting the closure for the body at the lower part thereof and an inverted well or housing rigid with the frame disposed transversely thereof and mud guards likewise rigid with the frame. More particularly, the body comprises two similar shell-like hood or cover members respectively pivotally connected at opposite ends of the frame for swinging movement away from one another toward the opposite ends of the frame to provide for access to the vehicle, the inverted housing having a motor enclosed and supported within the same and the floor supporting seats placed back to back and on opposite side of the inverted housing with the respective side walls of the housing supporting the backs of the respective seats. The steering gear, wheel suspension members and other conventional vehicle components are supported by the floor or the frame.

According to a main feature of the invention the wheels are disposed in diamond-shaped relation and present transversely aligned medial wheels and respective fore and aft wheels disposed in the longitudinal medial plane of the vehicle.

There is thus presented a vehicle with the seats, engine and transmission unit and the passengers supported in the center of the vehicle and the two body members respectively swingable upwardly and away from the center of the vehicle toward the opposite ends to provide access to the vehicle over a substantial area of the lateral limits of the frame and floor permitting easy access with an absolute minimum of vehicle height.

It is particularly noted that the respective body members or hoods are not provided with doors. Thus, they constitute closed shell members having uninterrupted side, end and top walls. Obviously a portion of the side and end walls constitutes a transparent windshield.

According to another feature of the invention, the connection of the wheels to the floor or frame or chassis-floor is effected by means of levers arranged substantially in the form of a parallelogram linkage transversely articulated, to which the steering road wheels particularly, the front and rear wheels are connected by a journal and bearing, the non-steering wheels, including the driving wheel, by a casing.

In the form of construction of the invention chosen by way of example, the wheels are disposed at the corners of a lozenge, the frame forming the chassis is symmetrical with respect to the central transverse plane of the vehicle, the load, passengers or other, is disposed on both sides of the said plane, roughly represented in practice by a cross member referred to hereinafter. The groups of persons have their backs against the said cross member.

In the accompanying drawing:

Figure 1 is a longitudinal sectional view of a vehicle in accordance with the invention, taken along lines 1—1 of Figure 2 with parts in elevation and with a dotted line showing of the body members swung upwardly;

Figure 2 is a sectional plan view of a vehicle in accordance with the invention taken along lines 2—2 of Figure 1 and with the top or cover of the body in section;

Figure 3 is a transverse sectional view through the vehicle along lines 3—3 of Figure 1; and Figure 4 is a transverse sectional view taken along lines 4—4 of Figure 1.

For a more ready understanding of the architecture of the vehicle, certain parts have been represented in thick lines on the attached drawing, although conventionally they should have been represented in broken lines, dotted lines or fine lines.

The wheels preferably have different sizes, the fore and aft longitudinally aligned end wheels 1 being of smaller diameter than the wheels 2 situated at the sides, close to the transverse median plane and called in the following description median wheels or lateral median wheels.

For steering the vehicle, the front and rear wheels are connected by gearing and shafts, illustrated diagrammatically at 3 in the drawings. The steering is controlled mechanically by a steering mechanism 4 of the usual type. If the vehicle is intended for military use there may be two driving positions, one at the front end and one at the back.

The median wheels 2 are driving wheels and are driven from the engine-transmission unit 5 disposed transversely of the frame, through two transverse Cardan shafts, not shown.

The front and lateral median wheels are provided with brake drums, the rear wheel only is so provided, in the case of a vehicle for military use.

The connection of the wheels to the floor-chassis is ensured by transversely articulated parallelograms 6 and 7 bearing on transverse members 8 and 9 having a section which has a closed contour and forming part of the frame of the chassis. The lever arms of the parallelograms are equal, they thus constitute an element of the shock absorbing and stabilizing mechanism of the suspended part.

The frame and floor are constituted by members which may be pressed or otherwise formed and preferably assembled by electric spot or like welding. The attached drawing shows the frame and floor of a vehicle, having four or six seats in two groups of two or three seats with their backs against and supported by a transverse frame member in the form of an inverted well or housing 10. This housing 10 has spaced side walls and a top. The side walls of the housing constitute the under frame or support for the backs of the seats 11 which are resting on the floor 17. This transverse member 10 supports and envelops the components and accessories constituting the engine transmission unit, which is also arranged transversely of the vehicle. In order to insure the proper thermal and acoustic insulation, the housing 10 is provided with an opening and a cover 12, Fig. 3, permitting access to the engine and its attachments and with all necessary supports and reinforcements; finally it is conditioned to form a hot air intake nozzle 13, Fig. 3, the air being collected either at the outlet from the radiator 14, Fig. 3, preferably fixed to the cross member 10 adjacent either the hot parts of the engine or its attachments or accessories. The part of the cross member forming the nozzle communicates with section members 15, Figs. 1–3, having a closed contour, of the housings for the lateral median wheels, forming mud-guards 16 hereinafter referred to. The upper part of the cross member 10, is, in addition, arranged to support seats or bunks for children, supports for light luggage, etc.

The shape and dimensions of the cross member 10 assures to it a high rigidity in bending, to all practical purposes. To its lowest part are fixed, by welding, floor elements 17, Figs. 3 and 4, connected on the other hand to other elements of the chassis-floor which will be referred to later. The cross member 10 is fixed at each of its ends to the walls 18, Fig. 3, or the housings for the lateral median wheels forming part of the mud-guards 16.

The part played by the housings for the lateral median wheels is twofold, apart from their role as mudguards, they constitute a girder element resisting bending and torque owing to their pressed form and also owing to the fact that they are edged around their entire periphery by elements attached by welding, forming a section member having a closed contour 15 and 19, Fig. 3. The floor elements 17 referred to in the paragraph relating to the median cross member are fixed by welding or in any other manner to the lower part of the said wheel housings, against which abut four girders 20, Figs. 1, 2, 4, and to which said girders are solidly fixed at the points at which abut the above described strengthening members of closed-contour section for the wheel housings 16. Strengthening members 21, Figs. 1 and 2; and 22, Fig. 2, are also provided to ensure the necessary rigidity and resistance at the point of connection. An opening puts into communication the interior of the closed-contour strengthening members for the wheel housings and the interior of the girders 20 forming a conduit, their inverted U section being closed at the lower part by the above mentioned floor elements 17, Fig. 4. The conduits thus constituted serve to convey hot air (collected behind the radiator 14, Fig. 3) towards the end or ends of the vehicle. The amount of air may be controlled manually at the will of the passengers by operating a suitable valve device 23, Fig. 3, or also automatically by a thermostat or by the combination of the two means.

The girders 20 abut the transversely disposed end members 8 of the frame, Figs. 1 and 2, which as shown are tubular thereby having a closed contour section and to which they are welded or fixed by any other means. They form, towards the exterior of the vehicle, supports for the body denoted at 24 in Fig. 4. In this connection the body as shown in Fig. 1 constitutes to similar shell-like hood or cover members denoted generally by the references A and B. As indicated in Fig. 4 the girders 20 are flanged channel irons with the inner flange secured by welding to the floor element 17 and the flange extending laterally outwardly toward the outer side of the floor is of increased width and supports the lower marginal edges of the body members A and B. Any suitable means are provided for pivotally interconnecting the body members A and B to swing about the axis of the tubular members 8 constituting the transverse frame elements at the opposite ends of the vehicle. The particular construction of the pivot means connecting the respective body shell members to the frame at the transverse elements 8 forms no part of the present invention, any suitable hinge means being effective. It is further noted that the downturned outer edges of the girders 20 overlap the side edges of the floor elements 17 as shown in Fig. 4 and thus in effect constitute a part of the external vehicle wall denoted at 25. As indicated in Figs. 1 and 3 the lower marginal surface of the body or hood members A and B is curved upwardly adjacent the medial wheels 2 so that the body members freely swing away from one another toward the opposite ends of the frame. As shown in Fig. 3 the lower edges of the body members terminate just below the top edge of the medial wheel. The assembly of the girders 20, Fig. 4, and the floor elements 17, Fig. 4, is effected on the vertical or substantially vertical parts of the two members, in order to increase the resistance of the assembly to bending, the inverted U-shaped branch of the girder, located towards the interior of the vehicle is fixed to a horizontal part of the floor 17, Fig. 4. The body-hood rests, through the intermediary of a gas and liquid tight elastic joint indicated diagrammatically at 26, Fig. 4, on the support constituted by the external flange of the girder 20, at all other points, fluid tightness is ensured by the same general means, adapted as a function of the type of body selected and of the disposition of the point to be rendered tight.

Two other girders 27, Figs. 2 and 4, are very solidly fixed to the respective front and rear walls of the median cross member and, on the other hand to the housings 28 for the front and rear wheels. These girders are situated here on both sides of the longitudinal axis of the vehicle, they have the form of an inverted U, and serve as housings for the connecting and controlling members 3, Figs. 2 and 4, for the front and rear (steering) wheels, for the various rods and conduits, the connecting members for the suspension system etc.

The housings 28, Figs. 1, 2, 4, for the front and rear wheels, forming mudguards are supported by the transverse members 29 of a section having a closed contour. These members 29 are rigidly connected to the girders 20 by braces 29a. The outer ends of the housing 28 are fixed to the transverse members 8 located at the ends of the chassis, likewise of closed-contour section. The two transverse members 8 receive the supports 30, Figs. 1 and 2, for the members connecting the front and rear wheels to the chassis; the shape of the housings for the front and rear wheels may envelop them more or less exactly in the extreme upper positions resulting from the play of the suspension system and from the movements necessitated by or due to the steering of the vehicle. These wheel housings also serve as a support (31, Figs. 1 and 4) for luggage (32, Figs. 1 and 4), tool boxes steering column, and as supports for the walls of the body-hood. The flat walls of the wheel housings may or may not be provided with strengthening ribs, produced by pressing or attached thereto. They are constituted by a number of elements so selected as to reduce the weight and the cost and above all as a function of the means of construction at the disposal of the manufacturer. They comprise openings and covers (not shown in the drawings) necessary for access to the wheels and their attachments.

It will be understood that the present invention, in one of its broadest aspects contemplates a general arrangement of an automobile vehicle assuring a number of results, relating to: lowering the selling price, performance, a pleasing appearance and a reliability superior to vehicles of the usual type for the same running costs and, in consequence, in looking at it from this point of view, the claims are not limited to the arrangement of the members here shown and described for example: The vehicle may comprise any number of seats, the chassis may be of cast metal, synthetic material, reinforced or not, monobloc or multibloc, assembled by mechanical or other means, having the same general arrangement.

The wheels may be all of the same diameter, or they may be of different diameters, but arranged in converse manner with respect to that already described. The wheels and tires may be multiplied at the corners of the triangle or lozenge in accordance with the load and its distribution.

The connection of the wheels to the floor-chassis may, in order to facilitate the constructions, be effected by longitudinally articulated parallelograms, or by leaf springs giving approximately the same result. The levers constituting the parallelograms or the springs taking their place, may be of unequal lengths and do not necessarily constitute part of the shock absorbing and stabilising devices.

The front and rear driving wheels, may be mounted for the steering of the vehicle, the front wheel alone being controlled and the rear wheel automatically orientable in accordance with the manner in which it is connected to the chassis.

It is therefore seen that I have provided a unique vehicle embodying a diamond-shaped wheel arrangement and in which the frame is constituted by the floor element 17 to which are rigidly fixed by welding the side and end girders 20 and 8 respectively and at the middle of the vehicle and transversely disposed housing 10 is rigidly embodied with the frame to envelop the engine transmission unit and also to support the backs of the seats 11. The various components of the mud guards for the medial wheels 2 are rigidly interconnected between the housing and the side girders 20. Reinforcing girders 22 are provided to enhance this rigid relationship. The fore and aft mud guards 28 are connected by means of the inverted channel member 27 to the floor and the rigid transverse housing 10 and the outermost ends of the respective mud guards 28 are rigid with the transverse end frame members 8. There is thus provided a rigid frame and floor structure and to which is pivotally connected the body members A and B by any suitable pivoting means to permit upward swinging movement of the body members away from one another about the axis of the transverse end frame members 8, as illustrated diagrammatically by dotted lines in Figure 1.

Having described the invention, what I claim and desire to secure by Letters Patent is:

1. An automotive vehicle including a rigid frame, wheels arranged in diamond-shaped relation and including transversely aligned medial wheels and fore and aft longitudinally aligned wheels carried by the frame, said frame including a rigid inverted transversely disposed housing having spaced side walls and a top, the side walls extending transversely of the vehicle, and floor sections extending forwardly and rearwardly from the lower extremities of the housing, a motor supported and enclosed within said housing, seats arranged back to back on the floor sections with the side walls of the housing supporting the backs of the seats, oppositely facing shell-like body members each having uninterrupted side walls, an outer end wall and a top wall, and means at the opposite ends of the frame pivotally connecting the body members thereto for vertical swinging movement away from each other toward the opposite ends of the frame.

2. An automotive vehicle as defined in and by claim 1, in which the frame includes mud guards rigid with the frame for the fore and aft wheels, the external ends of the mud guards terminating substantially at the opposite ends of the frame.

MARCEL ANTOINE CLÉMENT ALAMAGNY.

REFERENCES CITED

The following references are of record in the file of this patent:

UNITED STATES PATENTS

| Number | Name | Date |
|---|---|---|
| 889,960 | Palmer | June 9, 1908 |
| 970,238 | Kerstetter | Sept. 13, 1910 |
| 1,239,328 | Whitcomb | Sept. 4, 1917 |
| 1,544,775 | Plocek | July 7, 1925 |
| 1,852,464 | Leipert | Apr. 5, 1932 |
| 1,868,382 | Coadou | July 19, 1932 |
| 2,067,546 | Rocher | Jan. 12, 1937 |
| 2,076,722 | Heinze | Apr. 13, 1937 |
| 2,130,066 | Burgh | Sept. 13, 1938 |
| 2,148,308 | Spear | Feb. 21, 1939 |
| 2,385,480 | Webster | Sept. 25, 1945 |

FOREIGN PATENTS

| Number | Country | Date |
|---|---|---|
| 462,435 | France | Nov. 22, 1913 |
| 474,270 | France | Nov. 17, 1914 |
| 791,530 | France | Sept. 30, 1935 |